US008639627B2

(12) United States Patent
Schnell et al.

(10) Patent No.: US 8,639,627 B2
(45) Date of Patent: Jan. 28, 2014

(54) PORTABLE DIGITAL RIGHTS FOR MULTIPLE DEVICES

(75) Inventors: Patrik Schnell, Issaquah, WA (US); Kevin Lau, Redmond, WA (US); James M Alkove, Redmond, WA (US); Alexandre V Grigorovitch, Redmond, WA (US); Ryan A Haveson, Woodinville, WA (US); Max G Morris, Seattle, WA (US); Scott A Plette, Kirkland, WA (US); Clifford P Strom, Sammamish, WA (US); Alexander McKelvey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 11/954,211

(22) Filed: Dec. 12, 2007

(65) Prior Publication Data

US 2009/0012805 A1 Jan. 8, 2009

Related U.S. Application Data

(60) Provisional application No. 60/948,313, filed on Jul. 6, 2007.

(51) Int. Cl.
*G06F 21/00* (2013.01)

(52) U.S. Cl.
USPC .................... 705/59; 705/51; 705/52; 705/57

(58) Field of Classification Search
USPC .......................................... 705/51, 52, 57, 59
See application file for complete search history.

(56) References Cited

U.S. PATENT DOCUMENTS

| 6,931,545 | B1 | 8/2005 | Ta et al. |
| 7,133,846 | B1 | 11/2006 | Ginter et al. |
| 7,139,372 | B2 | 11/2006 | Chakravorty et al. |
| 7,152,046 | B2 | 12/2006 | Wang et al. |
| 7,213,157 | B2 | 5/2007 | Dariel |
| 2005/0021556 | A1 * | 1/2005 | Noguchi et al. ............... 707/102 |
| 2005/0044016 | A1 * | 2/2005 | Irwin et al. ...................... 705/30 |

(Continued)

FOREIGN PATENT DOCUMENTS

| EP | 1635545 A1 * | 3/2006 | ............ H04M 1/725 |
| WO | WO 2004/102459 A1 * | 11/2004 | ............. G06F 21/00 |
| WO | WO 2005/036854 A1 * | 4/2005 | ............. H04L 29/06 |
| WO | WO 2005/050415 A1 * | 6/2005 | ................ G06F 1/00 |

OTHER PUBLICATIONS

Merriam-Webster's Collegiate Dictionary 10th Edition, Merriam-Webster, Inc., all pages, 1993.*

(Continued)

*Primary Examiner* — Calvin Cheung
(74) *Attorney, Agent, or Firm* — Wolfe-SBMC

(57) ABSTRACT

Portable digital rights for multiple devices is described. In an embodiment, a digital rights management (DRM) system includes a first device with a removable component configured as a token that is associated with a DRM license. The first device also includes a removable memory card that stores protected media content on which the first device can perform actions as permitted by the DRM license. The DRM system also includes a second device that can have the removable component and the removable memory card when removed from the first device and installed in the second device such that the second device can perform the actions on the protected media content as permitted by the DRM license.

15 Claims, 5 Drawing Sheets

(56) References Cited

U.S. PATENT DOCUMENTS

| | | | |
|---|---|---|---|
| 2005/0070248 A1* | 3/2005 | Gaur | 455/410 |
| 2005/0198376 A1* | 9/2005 | Kotzin | 709/238 |
| 2005/0198510 A1 | 9/2005 | Robert et al. | |
| 2005/0246282 A1* | 11/2005 | Naslund et al. | 705/52 |
| 2005/0267845 A1* | 12/2005 | Oh et al. | 705/51 |
| 2005/0278787 A1* | 12/2005 | Naslund et al. | 726/26 |
| 2006/0112282 A1* | 5/2006 | Dariel | 713/189 |
| 2006/0135127 A1* | 6/2006 | Aarnio et al. | 455/412.1 |
| 2006/0190413 A1* | 8/2006 | Harper | 705/65 |
| 2006/0206710 A1* | 9/2006 | Gehrmann | 713/168 |
| 2006/0218650 A1 | 9/2006 | Costa-Requena | |
| 2006/0240806 A1 | 10/2006 | Demirbasa et al. | |
| 2006/0265333 A1* | 11/2006 | Gomes et al. | 705/57 |
| 2007/0027814 A1* | 2/2007 | Tuoriniemi | 705/59 |
| 2007/0067851 A1* | 3/2007 | Fernando et al. | 726/26 |
| 2007/0088837 A1* | 4/2007 | Gidron et al. | 709/228 |
| 2007/0094737 A1 | 4/2007 | Larsson et al. | |
| 2007/0157318 A1* | 7/2007 | Lee et al. | 726/27 |
| 2007/0198430 A1* | 8/2007 | Takahashi et al. | 705/59 |
| 2008/0015997 A1* | 1/2008 | Moroney et al. | 705/51 |
| 2008/0027868 A1* | 1/2008 | Ljung et al. | 705/51 |
| 2008/0065552 A1* | 3/2008 | Elazar et al. | 705/59 |
| 2008/0270311 A1* | 10/2008 | Peterka et al. | 705/59 |
| 2009/0006845 A1* | 1/2009 | Charbonnier et al. | 713/156 |
| 2009/0064341 A1* | 3/2009 | Hartung et al. | 726/27 |
| 2009/0165080 A1* | 6/2009 | Fahn et al. | 726/1 |
| 2010/0217974 A1* | 8/2010 | Fujimoto et al. | 713/155 |

OTHER PUBLICATIONS

"DRM Specification V2.0 Draft Version 2.0", Open Mobile Alliance (OMA), all pages, Apr. 20, 2004.*

Lawrence Harte, "Introduction to Digital Rights Management (DRM) Identifing, Tracking, Autorizing and Restricting Access to Digital Media", all pages, Aug. 16, 2006.*

Safavi-Naini et a., "Import/Export in Digital Rights Management", 2004, ACM.

Rosenblatt, "Integrating DRM with P2P Networks: Enabling the Future of Online Content Business Models", Nov. 18, 2003.

"9 Steps to Sustain Identity Centric Security", Sep. 27, 2006, Identity Centric Architecture.

* cited by examiner

PORTABLE DIGITAL RIGHTS FOR MULTIPLE DEVICES

RELATED APPLICATION

This application claims the benefit of a related U.S. Provisional Application Ser. No. 60/948,313 filed Jul. 6, 2007, entitled "Portable Digital Rights for Multi Device Content Use", to Haveson et al., which is incorporated by reference herein.

BACKGROUND

Users can enjoy media content purchased on a physical media, such as songs purchased on a CD (compact disc) or a movie purchased on a DVD (digital versatile disc). Users often buy the media content on physical media and have come to expect that they can enjoy the content when they want and as often as they want. Further, users have grown accustomed to the implicit benefits of buying media content on a CD or DVD. For example, a user can lend a movie or CD to a friend, or enjoy the content on whatever device they have that can play and/or display it. A user can play a CD in their home, in their car, or in a portable device simply by moving the CD from one player to another.

More recently, users are able to access media content digitally, such as through subscription and pay-per-view services. These services have benefits, but also disadvantages over buying content on physical media. The advantages include more-flexible ways to pay and use content, such as accessing content for a period of time when subscribing to a service that allows playing a particular song on an MP3 player for a set number of days. A user can also pay to download media content a certain number of times, such as when "buying" a song to have a right to download it to a computer and then record/transfer it to other devices or storage a limited number of times. In another example, a user can order an on-demand movie and pay once to view the movie, such as at home.

Some content distribution services, however, do not permit users to enjoy media content in the ways in which they have grown accustomed. Someone who, in the past, could buy a song on CD and play it on any CD player that she, a family member, or a friend owns, often cannot do so using these services. Media content that is available from a content distribution service is licensed for security and to protect it from unauthorized sharing, copying, and/or distribution of the media content.

Digital rights to restrict the use of media content can be in the form of a license that also requires a security token to be available for the license to be useful. Typically, the digital rights for media content are bound to a security token. However if a security token is lost, or if identities corresponding to the security token change over time, then a license for the digital rights would need to be reissued for a user to play or view media content that they have already "purchased". In addition, the licenses for the digital rights of media content as stored on a device are bound to that device alone and are not portable with the media content from one playback device to the next.

SUMMARY

This summary is provided to introduce simplified concepts of portable digital rights for multiple devices. The simplified concepts are further described below in the Detailed Description. This summary is not intended to identify essential features of the claimed subject matter, nor is it intended for use in determining the scope of the claimed subject matter.

In embodiment(s) of portable digital rights for multiple devices, a digital rights management (DRM) system includes a first device with a removable component configured as a token that is associated with a DRM license. The first device also includes a removable memory card that stores protected media content on which the first device can perform actions as permitted by the DRM license. The DRM system also includes a second device that can have the removable component and the removable memory card when removed from the first device and installed in the second device such that the second device can perform the actions on the protected media content as permitted by the DRM license. In an embodiment, the removable component and the removable memory card are a combined component such that the removable memory card is the token associated with the DRM license.

In other embodiment(s) of portable digital rights for multiple devices, a digital rights management (DRM) system includes a domain of multiple devices each having a private key that is common to the domain. The domain also includes unique certificates associated with a DRM license for each of the multiple devices of the domain. The DRM system also includes a first device of the domain with a device component that corresponds to a first unique certificate that is associated with the DRM license. The first device also includes a removable memory card to store protected media content on which the first device can perform actions as permitted by the DRM license. Further, a second device of the domain includes an additional device component that corresponds to a second unique certificate that is associated with the DRM license. The second device can then include the removable memory card when removed from the first device and installed in the second device such that the second device can perform the actions on the protected media content as permitted by the DRM license associated with the additional device component. In an embodiment, each of the unique certificates for the multiple devices include identifiers corresponding to the device components which are tokens associated with the DRM license for the multiple devices.

BRIEF DESCRIPTION OF THE DRAWINGS

Embodiments of portable digital rights for multiple devices are described with reference to the following drawings. The same numbers are used throughout the drawings to reference like features and components.

DETAILED DESCRIPTION

Figure 1:
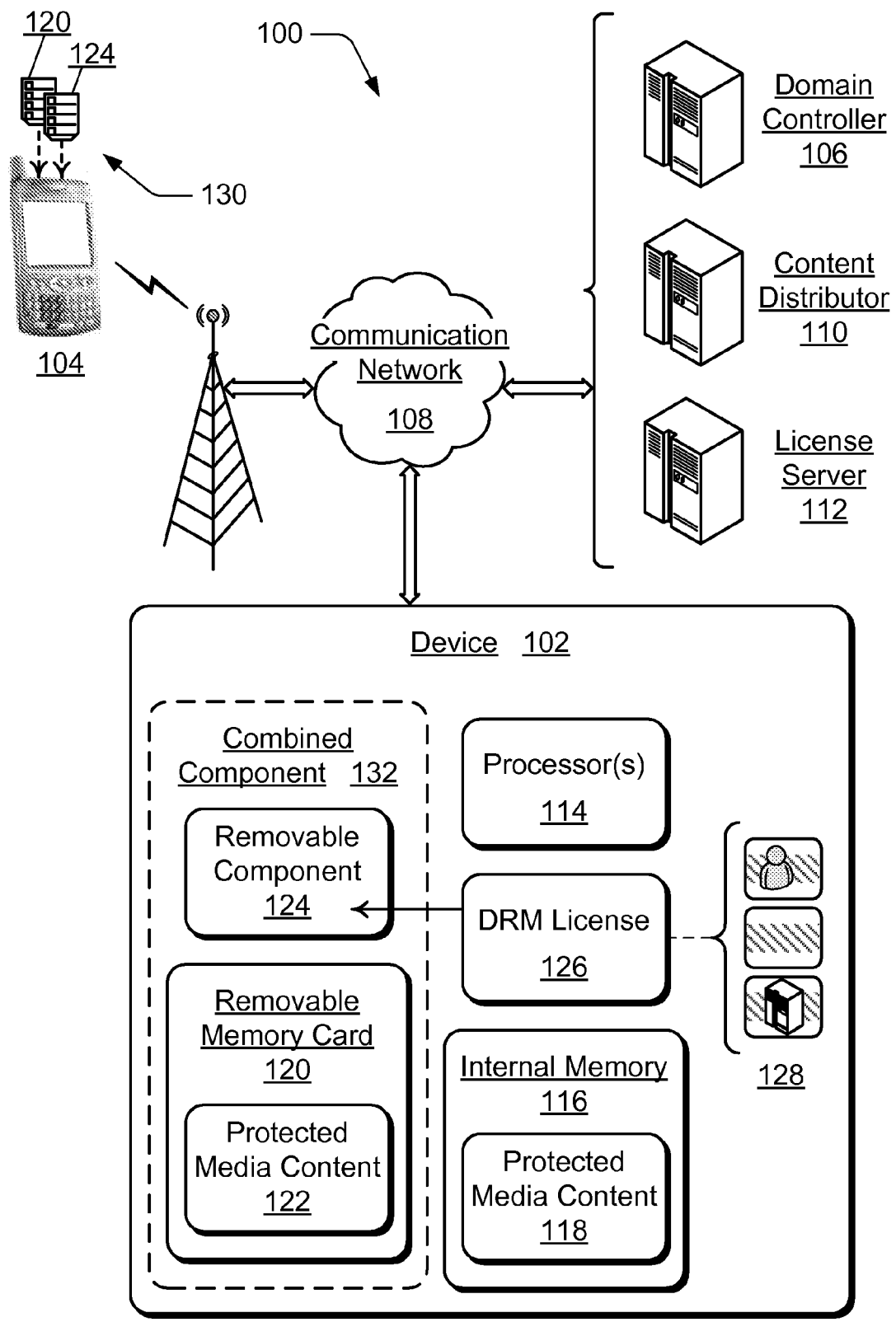
FIG. 1 illustrates an example digital rights management (DRM) system in which embodiments of portable digital rights for multiple devices can be implemented.

Embodiments of portable digital rights for multiple devices provides techniques to manage the rights and restrictions associated with a digital rights management (DRM) license for protected and/or licensed media content. As described herein, protected media content can include any type of media content that is purchased, downloaded, or otherwise obtained, such as music, a movie, an application, a game, and other media content that is subject to a DRM license to protect it from unauthorized sharing, copying, and/or distribution.

In an example DRM system, various devices can be implemented to perform actions on protected media content as permitted by a DRM license. A device can include any type of portable communication device, music device, television client device, a gaming system, and the like which can perform actions such as to render, playback, copy, print, execute, consume, and/or other actions on the protected media content. The DRM license provides the rights and restrictions of the actions performed on the protected media content.

In the DRM system, a first device can include a removable component that is a token associated with a DRM license for the system. For example, the removable component of the device may include a Subscriber Identity Module (SIM) card or similar component that is the hardware token associated with the DRM license for the device. The first device can also include a removable memory card that stores protected media content on which the first device can perform actions as permitted by the DRM license. The removable component (e.g., the token that is associated with the DRM license) and the removable memory card can be removed from the first device and installed in a second device such that the second device can perform the actions on the protected media content as permitted by the DRM license. In an embodiment, the removable component and the removable memory card are a combined component such that the removable memory card is the token associated with the DRM license.

In another example DRM system, a domain can include multiple devices that each have a private key which is common to the domain. The domain can also include unique certificates associated with a DRM license for each of the multiple devices of the domain. In addition, protected media content can also be bound to the domain such that a device which is a member of the domain having the domain private key and a unique certificate can perform actions on the protected media content that is bound to the domain. For example, a removable memory card that stores protected media content in a first device of the domain can be moved to a second device of the domain and the second device can perform actions on the protected media content if the second device also has a device component that is associated with the DRM license for the domain. In an implementation, each of the multiple devices has a SIM card such that only the removable memory card with the protected media content is moved between devices.

In an embodiment, a first device of the domain in the DRM system can include a device component that corresponds to a first unique certificate that is associated with the DRM license for the system. For example, the device component can be a removable component, a SIM card, or other device token. A second device of the domain can also include a device component that corresponds to a second unique certificate that is associated with the DRM license for the system. The first device of the domain can include a removable memory card to store protected media content on which the device can perform actions as permitted by the DRM license. The removable memory card can then be removed from the first device and installed in the second device such that the second device can perform the actions on the protected media content as permitted by the DRM license that is associated with the device component in the second device. In an embodiment, each of the unique certificates for the multiple devices include identifiers corresponding to the device components which are the tokens associated with the DRM license for the multiple devices.

While features and concepts of the described systems and methods for portable digital rights for multiple devices can be implemented in any number of different environments, systems, and/or various configurations, embodiments of portable digital rights for multiple devices are described in the context of the following example systems and environments.

FIG. 1 illustrates an example digital rights management (DRM) system 100 in which various embodiments of portable digital rights for multiple devices can be implemented. In this example, system 100 includes device 102 and device 104 that are each implemented to communicate with a domain controller 106 via a communication network 108. The example system 100 also includes a content distributor 110 of protected media content, and includes a license server 112.

The communication network 108 can be implemented as part of a media content distribution system and/or DRM system using any type of network topology and/or communication protocol, and can be represented or otherwise implemented as a combination of two or more networks. For example, the communication network 108 may include any suitable wired and/or wireless network(s) that allow device 102 and device 104 to communicate with a variety of entities to facilitate the distribution and/or protection of media content. Device 102 and device 104 can communicate with each other as well as with the domain controller 106, content distributor 110, and license server 112 via the communication network 108.

Any of the devices, such as device 102 in the DRM system 100, can be implemented as any one or combination of a portable communication device, television client device, music device, a gaming system, or as any other computing-based device, such as a desktop computer, a portable computer, an appliance device, and/or as any other type of device. In various embodiments, the devices can be implemented with any number and combination of differing components, such as a DRM platform, as further described with reference to the example device shown in FIG. 4. A device 102 or 104 may also be associated with a user (i.e., a person) and/or an entity that operates the device such that a "device" describes logical devices that may include users, software, and/or other components.

In this example, device 102 in the DRM system 100 includes one or more processor(s) 114 (e.g., any of microprocessors, controllers, and the like) which process various computer-executable instructions to control the operation of the device, to communicate with other electronic and computing devices, and to implement embodiments of portable digital rights for multiple devices. Device 102 can optionally include an internal memory 116 to store protected media content 118 (e.g., DRM protected media content, for example), and has the capability to host a removable memory card 120 to store protected media content 122. The protected media content 118 and/or 122 can include any type of media content that is purchased, downloaded, or otherwise obtained, such as music, a movie, an application, a game, pictures, a video clip, and the like. The content distributor 110 can provide the protected media content 118 and 122 to device 102 via the communication network 108.

Device 102 also includes a removable component 124 that is associated with a DRM license 126 (e.g., the DRM license is cryptographically bound to the removable component 124). In an embodiment, the removable component 124 is a token of the device 102, and the DRM license 126 is cryptographically bound to the token of the device. The removable component 124 can be implemented as a flash card, a Subscriber Identity Module (SIM) card, as a smart card, and/or as any other type of token of the device 102 that is associated with the DRM license 126. The removable component 124 can include a USIM (User Subscriber Identity Module) which is a logical entity on the card to store subscriber and/or authentication information. For example, the DRM license 126 may have various, associated license identifiers 128 such as a customer identifier, service identifier, and/or a domain identifier that, in any combination, authenticate the device to the domain controller 106 and to the license server 112 of the DRM system 100. The various, associated license identifiers 128 provide multiple playback criteria for determination whether a device can perform actions on the protected media content as permitted by the DRM license 126.

The domain controller 106 manages device membership in a domain and issues domain certificates and private keys to devices that are members of the domain. The license server 112 issues the DRM license 126 which provisions the rights and restrictions of actions performed on the protected media content 118 and/or 122. In an implementation, the domain controller 106 and the license server 112 can be managed by separate entities, or can be implemented together in a domain. Although the domain controller 106, content distributor 110, and license server 112 are described as distributed, independent components of the DRM system 100, any one or more of the controller(s), distributor(s), and server(s) can be implemented together as a multi-functional component or entity of the system. In various implementations, domain membership can also be managed by a network operator, a third party entity, or by a user.

When device 102 includes protected media content, such as protected media content 118 and/or 122, and the removable component 124 is installed, the device 102 can perform actions on the protected media content as permitted by the DRM license 126. The DRM license 126 provides the rights and restrictions of the actions performed on the protected media content, such as to render, playback, copy, print, execute, consume, and/or other actions on the protected media content. In an alternate embodiment, such as described with reference to the DRM system shown in FIG. 2, a domain can include a set of removable components that are associated with the domain certificates such that any of the removable components can be implemented as the basis to perform actions on the protected media content without the need to change the DRM license 126. In addition, the domain controller 106 can update the domain certificates to add and/or remove a subset of the removable components from the set of components that can be used with DRM license 126.

In the example system 100, the DRM license 126 can be moved from one device to another along with the removable component 124. For example, a user may remove the removable component 124 and the removable memory card 120 from device 102 and install them (at 130) in device 104. When the removable component 124 and the removable memory card 120 with the protected media content 122 are installed in device 104, the device can then perform the actions on the protected media content 122 as permitted by the DRM license 126.

If only the removable memory card 120 along with the protected media content 122 is removed from device 102 and installed in device 104, then device 104 will not be able to perform actions on the protected media content 122 because the corresponding DRM license 126 is not also installed in the device. In addition, device 102 is then restricted from performing the actions on the protected media content 118 that remains stored on the internal memory 116 when the removable component 124 along with the DRM license 126 is removed from the device.

In an alternate implementation, the DRM license 126 and/or the various, associated license identifiers 128 can be stored on the internal memory 116 of device 102. Before the removable component 124 is then removed from device 102 for installation in device 104, the DRM license 126 and/or the license identifiers 128 can be moved or migrated to the removable component 124 from the internal memory 116.

In an alternate embodiment of device 102, the removable component 124 and the removable memory card 120 can be a combined component 132 such that the removable memory card 120 is the token that is associated with the DRM license 126 (e.g., the DRM license is cryptographically bound to the removable memory card 120) for device 102. The DRM license 126 can then be removed from device 102 along with the combined component 132 and installed in device 104.

In an example, a user may acquire a new phone (e.g., device 104), remove the SIM (e.g., removable component 124) and flash card (e.g., removable memory card 120) from the old phone (e.g., device 102), and insert the SIM and flash card into the new phone. When the new phone is turned on, it can register on the network using a device identifier, a customer identifier provided by the USIM, and/or a service identifier (e.g., associated license identifiers 128). The network can detect that this is a returning customer with a new phone and trigger domain certificate provisioning. The network can keep track of identifier pairs (e.g., customer identifier and domain identifier) or identifier triplets (e.g., customer identifier, service identifier, and domain identifier), and in the scenario where a new device is registering with a previously established USIM, the network can identify that as an existing USIM/domain pair and send the appropriate information to the device. The information enables the device to join one or more domains through the domain controller 106 utilizing a domain protocol.

In an embodiment, the new device can be setup to join a domain utilizing the domain protocol and without user interaction. As a result of joining the domain, the device receives a domain certificate and associated private key bound to the device. The new device is now able to play any previously acquired content since the domain private key enables the device to extract content keys from the domain bound licenses and decrypt the content.

A unique SIM identifier can be included in the domain certificate which is added by the domain controller 106 when the domain certificate is issued. When the device client checks the validity of a domain license, it can validate or ensure that the SIM present on the device contains the identifier indicated in the domain certificate such that actions can be performed on the protected media content as provisioned by the DRM system.

Figure 2:
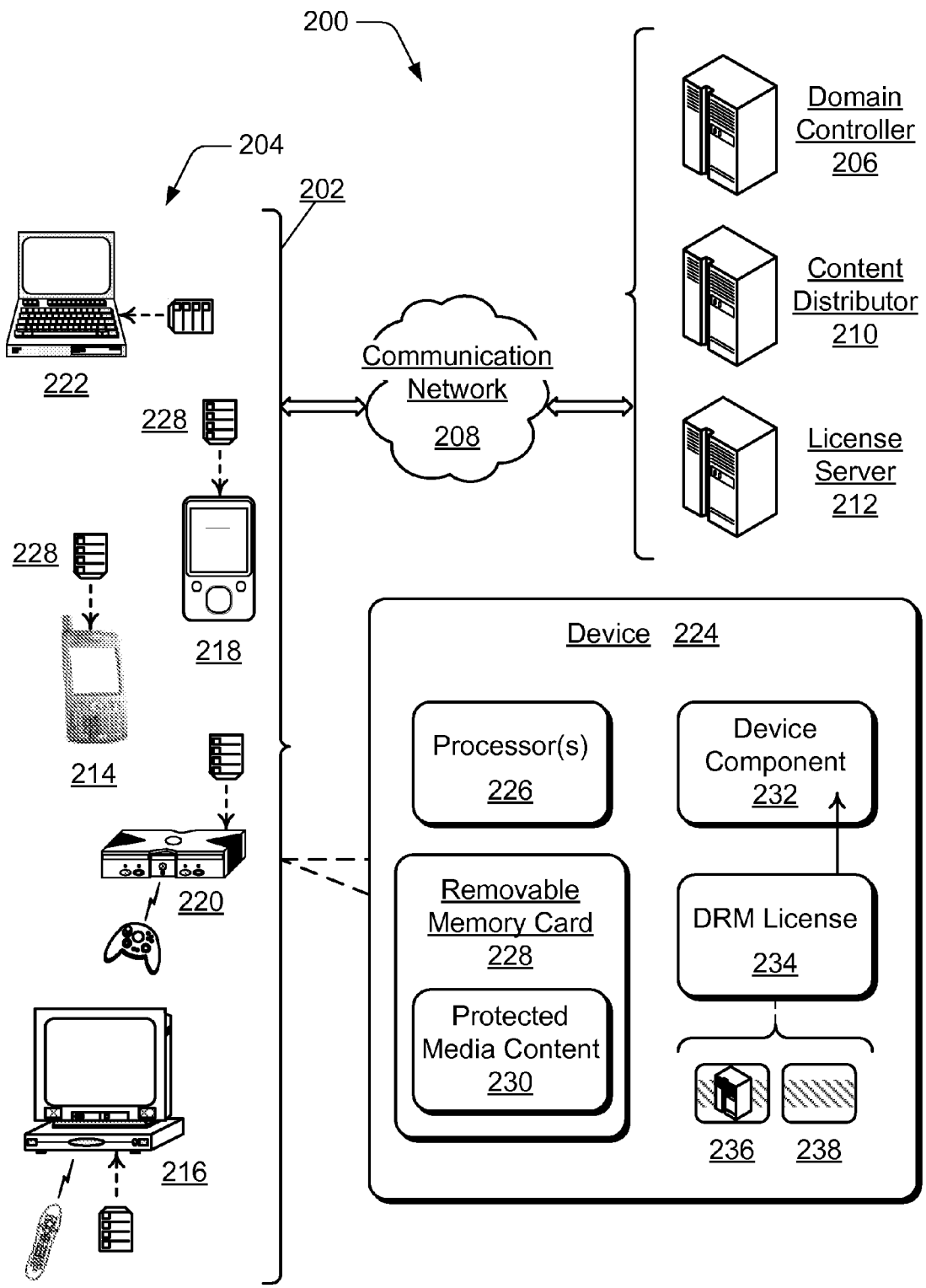
FIG. 2 illustrates another example DRM system in which embodiments of portable digital rights for multiple devices can be implemented.

FIG. 2 illustrates another example digital rights management (DRM) system 200 in which various embodiments of portable digital rights for multiple devices can be implemented. In this example, system 200 includes a domain 202 that includes multiple devices 204 which are registered to the domain and implemented to communicate with a domain controller 206 via a communication network 208. The example system 200 also includes a content distributor 210 of protected media content, and a license server 212 that the multiple devices 204 are implemented to communicate with via the communication network 208. The multiple devices 204 of the domain 202 may correspond to one user, or to several different users. An example of communication network 208 is described above with reference to communication network 108 shown in FIG. 1.

The multiple devices 204 that are registered to the domain 202 can be implemented as any one or combination of a portable communication device 214 (e.g., cellular phone), television client device 216, music device 218, a gaming system 220, or as any other computing-based device 222, such as a desktop computer, a portable computer, an appliance device, and/or as any other type of device. In various embodiments, the devices can be implemented with any number and combination of differing components, such as a DRM platform, as further described with reference to the example device shown in FIG. 4. Any of the multiple devices may also be associated with a user (i.e., a person) and/or an entity that operates the device such that a "device" describes logical devices that may include users, software, and/or other components.

A example device 224 is representative of any of the multiple devices 204 that are registered to the domain 202. The example device 224 includes one or more processor(s) 226 (e.g., any of microprocessors, controllers, and the like) which process various computer-executable instructions to control the operation of the device, to communicate with other electronic and computing devices, and to implement embodiments of portable digital rights for multiple devices. Example device 224 also includes a removable memory card 228 to store protected media content 230. As described previous, protected media content can include any type of media content that is purchased, downloaded, or otherwise obtained, such as music, a movie, an application, a game, pictures, a video clip, and the like. The content distributor 210 can provide the protected media content 230 to the multiple devices 204 of the domain 202 via the communication network 208.

The example device 224 also includes a device component 232 that is a token of the device 224 and is associated with a DRM license 234 (e.g., the DRM license is cryptographically bound to the device component 232). The device component 232 can be implemented as a removable component, a flash card, a Subscriber Identity Module (SIM) card that is associated with the DRM license, as a smart card, and/or as any other type of token of the example device 224. The DRM license 234 may also have various, associated license identifiers such as a customer identifier, service identifier, and/or a domain identifier that, in any combination, authenticate the device 224 to the domain controller 206 and to the license server 212 of the DRM system 200.

In an embodiment, the domain 202 includes a domain private key that is common to the domain, and includes unique certificates that are associated with a DRM license for each of the multiple devices 204 that are registered to the domain 202. For example, the DRM license 234 for device 224 has an associated domain private key 236 that is common to the domain 202, and has a unique certificate 238. In addition, each of the unique certificates for the multiple devices of the domain 202 include identifiers that correspond to the device components which are the tokens associated with the DRM license for the multiple devices.

When a device 204 includes protected media content, such as protected media content 230, and includes a device component that is associated with the DRM license for the device, the device can perform actions on the protected media content as permitted by the DRM license. The DRM license for a device provides the rights and restrictions of the actions performed on the protected media content, such as to render, playback, copy, print, execute, consume, and/or any other actions. In the system 200, a user may remove the removable memory card 228 from one device 214 of the domain 202 and install the removable memory card 228 in another device 218 of the domain. When the removable memory card 228 with the protected media content 230 is installed, the device 218 can then perform the actions on the protected media content 230 as permitted by the DRM license for the particular device.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example method 300 described with reference to FIG. 3 may be described in the general context of computer-executable instructions. Generally, computer-executable instructions can include applications, routines, programs, objects, components, data structures, procedures, modules, functions, and the like that perform particular functions or implement particular abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
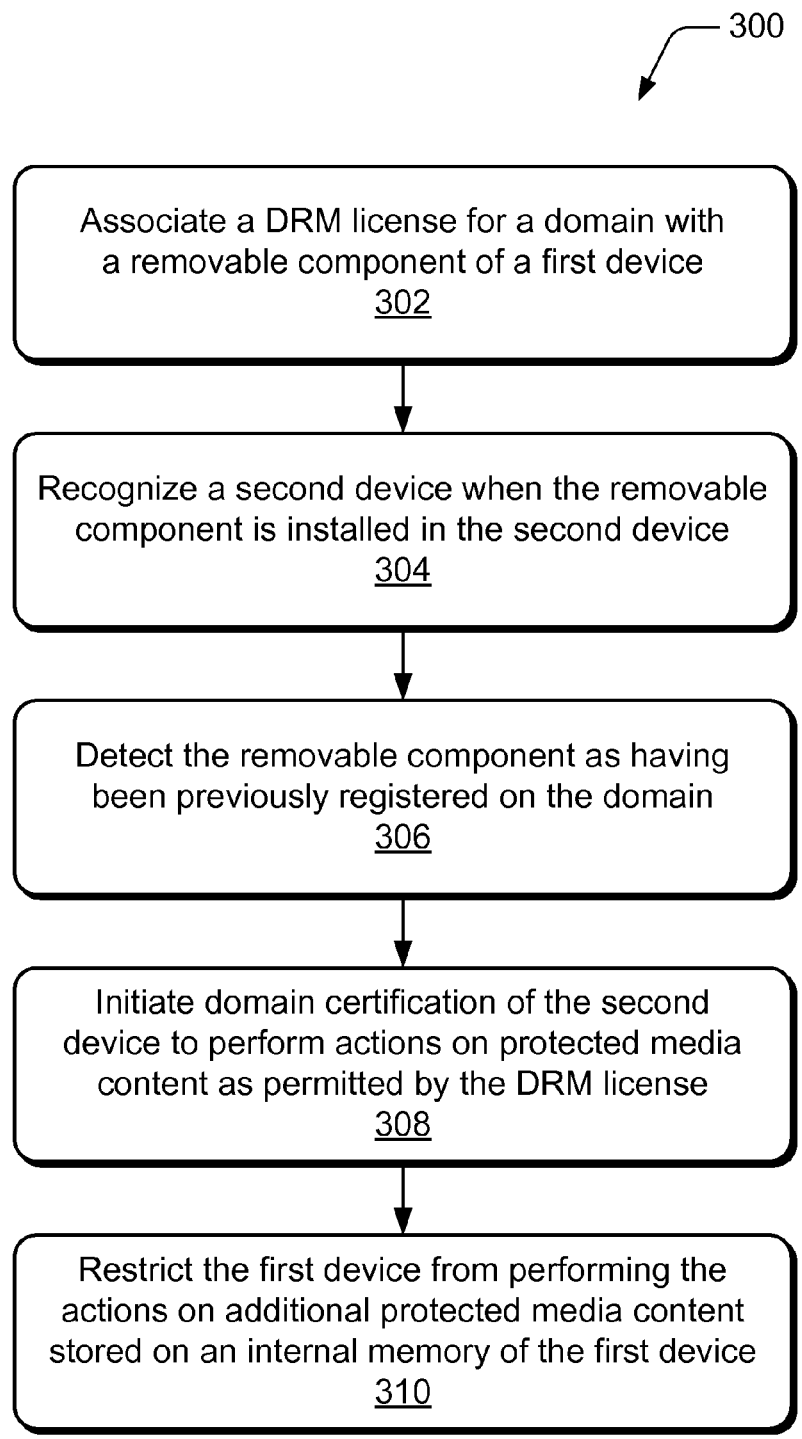
FIG. 3 illustrates example method(s) for embodiments of portable digital rights for multiple devices.

FIG. 3 illustrates example method(s) 300 of portable digital rights for multiple devices. The order in which the method is described is not intended to be construed as a limitation, and any number of the described method blocks can be combined in any order to implement the method, or an alternate method.

At block 302, a DRM license for a domain is associated with a removable component of a first device. For example, the DRM license 126 is associated with the removable component 124 in device 102 (e.g., the DRM license is cryptographically bound to the removable component 124) (FIG. 1). The removable component 124 can be implemented as a flash card, a Subscriber Identity Module (SIM) card, as a smart card, and/or as any other type of token of the device 102. The removable component 124 can also include a certificate and private key associated with the DRM license.

Device 102 also includes removable memory card 120 which stores protected media content 122 on which the first device can perform actions as permitted by the DRM license 126. For example, the DRM license 126 provisions the rights and restrictions of actions performed on the protected media content 122 such as to render, playback, copy, print, execute, consume, and/or other actions. In an embodiment, the removable component 124 and the removable memory card 120 can be a combined component 132 such that the removable memory card 120 is the token that is associated with the DRM license 126 for device 102.

At block 304, a second device is recognized when the removable component is installed in the second device, and at block 306, the removable component is detected as having been previously registered on the domain. For example, the domain controller 106 recognizes the second device 104 when the removable component 124 is removed from the first device 102 and installed in the second device 104. The domain controller 106 also detects that the removable component 124 has been registered on the domain (e.g., when installed in the first device 102). The DRM license 126 can be moved from one device to another along with the removable component 124. For example, a user may remove the removable component 124 and the removable memory card 120 from device 102 and install them (at 130) in device 104.

At block 308, domain certification of the second device is initiated such that the second device can perform the actions on the protected media content as permitted by the DRM license. For example, the domain controller 106 certifies the second device on the domain when the removable component 124 and the removable memory card 120 with the protected media content 122 are installed in device 104. The second device 104 can then perform the actions on the protected media content 122 as permitted by the DRM license 126.

At block 310, the first device is restricted from performing the actions on additional protected media content stored on an internal memory of the first device. For example, when the removable component 124 that is associated with the DRM license 126 is removed from the first device 102, the device 102 is then restricted from performing the actions on the protected media content 118 that remains stored on the internal memory 116.

Additional features, systems, and/or methods of portable digital rights for multiple devices are further detailed in the following description. Further, features and concepts of the described systems and methods for portable digital rights can be implemented in any number of different environments, computing systems, entertainment systems, and/or other various configurations.

Digital Rights Management (DRM) for Portable Devices enables device OEMs (original equipment manufacturers) to implement support for media DRM business models on mobile phones. Phones enabled with this technology allow users to acquire protected media content and licenses for playback on their mobile devices. As described herein, device OEMs can build functionality into mobile device implementations using the techniques described herein for DRM to enable that protected content can be played back on a mobile phone when the Subscriber Identity Module (SIM) of the user who acquired the content is present.

User scenarios utilizing a SIM for content playback are described to detail implementations of portable digital rights for multi-device content use as described herein. In an example application, a user may upgrade to a new media phone sold by a GSM wireless carrier and the user can download new music and videos directly to the new mobile device. The user can insert a SIM into the new device, power it on, and immediately start a media service application.

The user can utilize the media service application to browse for and purchase available media content, such as music and videos. When the user initiates a purchase of media content, such as music content, the music and a corresponding license are downloaded to the mobile device and the user can listen to the downloaded music. The user may then loan the new mobile device to a friend, but remove the SIM for the user's old phone to continue receiving phone calls.

The friend can insert his own SIM into the new phone and place some calls to try it out. However, when the friend attempts to playback the content previously acquired by the user, an error message indicates that the content was purchased by a different user and the SIM card used to purchase the media content is required for playback.

Another example application is described (continuing from the above-described scenario) to illustrate the feature of supporting multiple SIMs. When the friend attempts to play the media content previously acquired by the user, and he receives the error message, the friend can opt to purchase the right to play the content. When he confirms his purchase of the content, he can then enjoy listening to the content as well as opt to purchase additional media content. After the friend returns the phone to the user who places his own SIM card back in the phone, the user notices the new additional content purchased by his friend and attempts to play the file. The user then also receives a similar error message.

In an optional embodiment, a service provider may opt to implement a single SIM identifier. The service provider can then implement a technique to monitor for a DRM machine identifier mismatch error. For example, a user can only play acquired DRM content on the device with the correct SIM installed. If the user chooses to swap his phone with another subscriber, the new subscriber will find that content on the phone may not playback when his SIM is installed.

In addition, users may only be able to acquire content if the SIM used to create the device certificate is currently installed because the SIM used to create the device certificate may need to be present in order for DRM to initialize. If DRM does not initialize, licenses may not be correctly acquired and the OEMs implementing support for single SIM integration can then implement the technique to monitor for a DRM machine identifier mismatch error. Device OEMs can implement support for multiple SIMs (as described above) to provide an end-user experience, and to provide for cases in which users swap SIMs.

When subscribers (e.g., users) acquire used phones in a secondary phone market, it is likely that a user will want to reset a used phone to enable DRM content to be played with a different SIM. OEMs that support a single SIM identifier can implement a technique by which a new user could reset the DRM functionality on the mobile device. Doing so can enable that a new device certificate is created using the identifier of the new SIM, and that all content and licenses acquired in the future would be accessible by the new user.

OEMs can provide this functionality by implementing a method for both the device certificate and license store to be deleted. If both the device certificate and license store file are deleted from the used device, new ones can be created the next time that the device is initialized. If the new user's SIM is installed when the device certificate is created, new content and licenses acquired by that user will be available as long as the user's SIM continues to be present. However, implementing support for multiple SIM cards (as described above) provides for users that swap SIM cards. Implementing support for multiple SIM cards can facilitate that phones being acquired in the secondary market are usable by the new owners. OEMs can implement support for SIM integration in an event that users swap SIMs to facilitate DRM re-initializing. An implementation can include and initiate SIM verification when DRM is initialized.

SIM integration can be implemented with DRM porting kits. Devices that support DRM can be manufactured to contain a device certificate template that is the same across all instances of a particular device model. For example, if a company were to manufacture a new mobile phone, each instance of the phone can contain the same device certificate template. This template can contain multiple pieces of information, such as information about the device manufacturer, device DRM capabilities, and a certificate chain.

A device certificate template can be used by the DRM system to create a unique device certificate during the first DRM initialization process. During this process, a unique device identifier can be added to the device certificate. This device identifier can then be used during multiple DRM processes to ensure that the device certificate matches the device itself. This helps to prevent malicious users from removing a device certificate from one device and using it on another.

The device certificates can be created on the device and include a unique identifier that can be compared against the identifier on the device itself each time that DRM initializes. If the two values fail to match, the DRM system can fail to initialize and return an error matching code. Device OEMs can add support for the scenario of requiring a SIM for playback by altering the implementation of an OEM acquiring a unique identifier to return a unique identifier that is a combination of any unique data identifying the device, such as a serial number and unique SIM identifier in one embodiment. A hash of the two numbers is one method for doing this, and hashing algorithms can be used to add this functionality. Implementing the technique for an OEM to acquire a unique identifier (e.g., a function call), and returning the combination identifier, can cause a DRM failure to initialize if the correct SIM is not currently installed on the device. Because the DRM system will request the unique identifier each time that it initializes, the lack of a SIM or the presence of a new SIM can cause the value returned to be different than the one stored in the device certificate. As a result, DRM content will fail to play.

Device OEMs can add support for the scenario of supporting multiple SIMs by altering DRM reference code for portable devices to handle multiple device certificates and license stores. In an embodiment, a current SIM that is installed on a phone can be monitored so that DRM can be properly initialized, depending upon which SIM is installed. The technique to acquire the unique identifier can be altered as described above. The DRM reference code for portable devices can be altered to handle multiple certificates and license data stores, where a technique to acquire a device certificate is altered so that a proper certificate can be returned to the DRM system, depending on the SIM that is currently installed. Additionally, a technique to set the device certificate can be altered to handle more than one device certificate, and a pointer to the correct data store can be passed when calling to initialize a DRM manager. Altering the DRM for portable devices to support multiple device certificates can be done by updating technique to acquire a device certificate to return the correct device certificate to the DRM system, depending upon which SIM is currently installed on the device.

In an implementation, the technique to acquire a device certificate can also return a specific error in the event that a device certificate does not exist for the currently installed SIM. This can initiate the DRM manager initialize function to create a new certificate. In addition to implementing the technique to acquire a device certificate to return the certificate, OEMs can implement the technique to set a device certificate to write a separate device certificate if a different SIM is installed. The implementation to set a device certificate can then name device certificates so that they can later be associated with specific SIMs, and the technique to acquire a device certificate can determine which certificate to return depending on the SIM installed.

Figure 4:
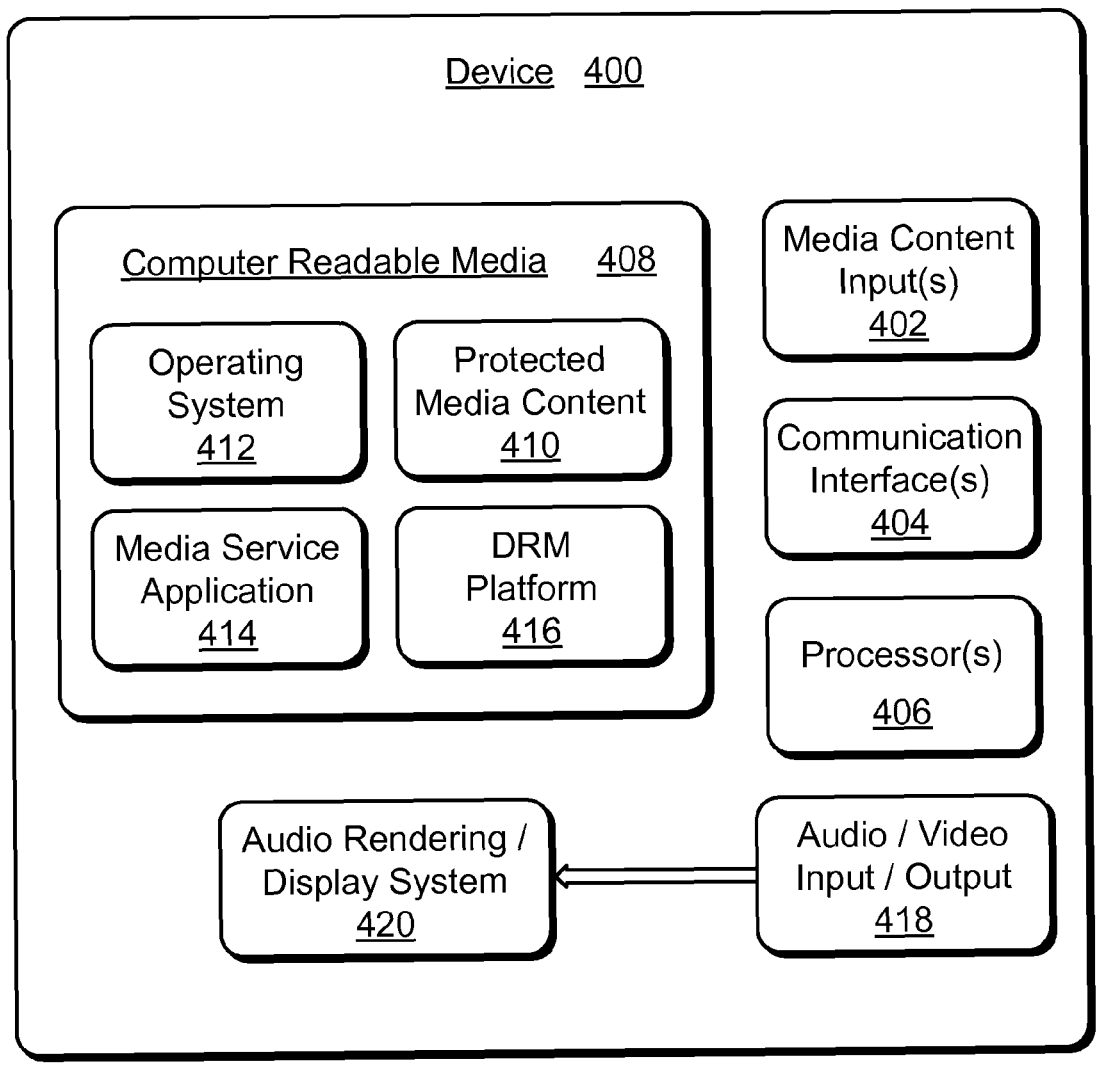
FIG. 4 illustrates various components of an example device which can be implemented in a DRM system.

FIG. 4 illustrates various components of an example device 400 that can be implemented in various embodiments as any one or combination of a computing, electronic, portable, gaming, appliance, client device, or any other type of device to implement embodiments of portable digital rights for multiple devices. For example, device 400 can be implemented as device 102 shown in FIG. 1, or as any of the various devices 204 shown in FIG. 2.

Device 400 includes one or more media content inputs 402 via which media content (e.g., licensed media content, protected media content, DRM media content, etc.) is received via a communication network. Device 400 further includes communication interface(s) 404 that can be implemented as any one or more of a serial and/or parallel interface, a wireless interface, any type of network interface, a modem, and as any other type of communication interface. A network interface provides a connection between device 400 and a communication network by which other electronic and computing devices can communicate data with device 400.

Similarly, a serial and/or parallel interface provides for data communication directly between device 400 and the other electronic or computing devices. A modem also facilitates communication with other electronic and computing devices via a conventional telephone line, a DSL connection, cable, and/or other type of connection. A wireless interface enables device 400 to receive data and content from a wireless communication network and/or input device.

Device 400 also includes one or more processor(s) 406 (e.g., any of microprocessors, controllers, and the like) which process various computer-executable instructions to control the operation of device 400, to communicate with other electronic and computing devices, and to implement embodiments of portable digital rights for multiple devices. Device 400 can be implemented with computer-readable media 408, such as one or more memory components, examples of which include a removable card, SIM card, random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 408 provides data storage mechanisms to store protected media content 410 as well as other information and/or data such as software applications and any other types of information and data related to operational aspects of device 400. For example, an operating system 412, a media service application 414, and a DRM platform 416 can be maintained as software applications with the computer-readable media 408 and executed on processor(s) 406 to implement embodiments of portable digital rights for multiple devices.

The DRM platform 416 can implemented as a component of the device and configured to implement the DRM techniques described herein. In addition to the various embodiments of portable digital rights for multiple devices described herein, any of the described embodiments or additional embodiments of portable digital rights can include features, systems, and/or methods pertaining to any one or combination of:

- Method(s) and/or System(s) for enabling a seamless flow of media content to SIM-enabled devices;
- Method(s) and/or System(s) for binding a DRM license to a SIM card;
- Method(s) and/or System(s) for binding a DRM license to a SIM card and a cellular phone;
- Method(s) and/or System(s) for binding a DRM license to a cellular phone and/or any type of identifier for multiple authentication;
- Method(s) and/or System(s) for using the concept of DRM domains to bind license content to security tokens and/or a set of devices by incorporating the conditionality of the security tokens in the domain credentials;
- Method(s) and/or System(s) for enabling portability of an already issued license by binding selected subsets of license stores to a DRM domain while other subsets of the license remain bound to a device;
- Method(s) and/or System(s) for maintaining a DRM data store with a SIM (subscriber identity module), removable flash card, or any other type of smart card; and
- Method(s) and/or System(s) for enabling licensed media content (e.g., protected media content, DRM protected media content, etc.) to be transferred between and rendered by various SIM-enabled devices.

Device 400 also includes an audio and/or video output 418 that provides audio and/or video data to an audio rendering and/or display system 420. The audio rendering and/or display system 420 can include any devices that process, display, and/or otherwise render audio, video, and image data. The audio rendering and/or display system 420 can be implemented as integrated components of the example device 400, or as separate components.

Figure 5:
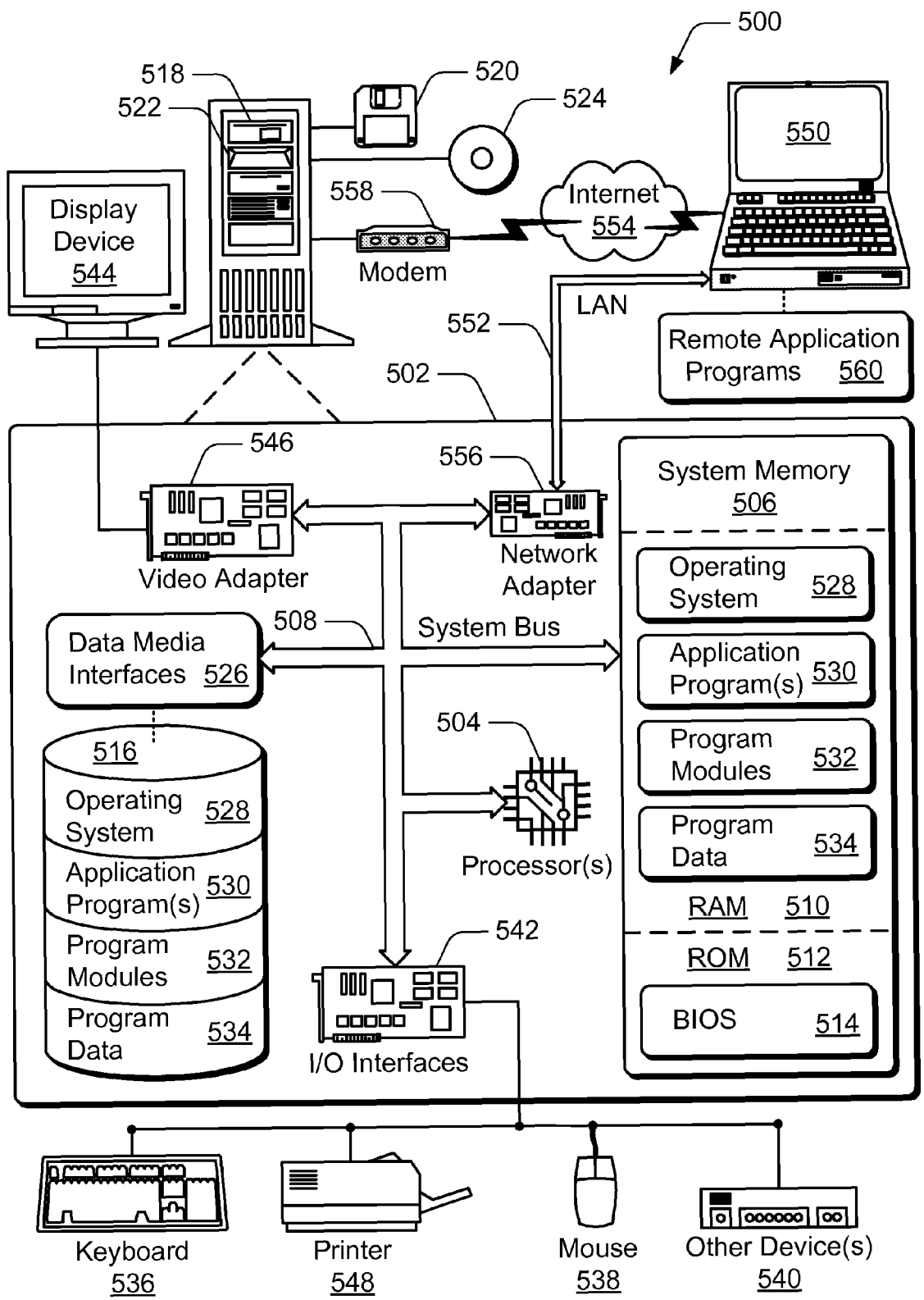
FIG. 5 illustrates exemplary computing systems, devices, and components in an environment that portable digital rights for multiple devices can be implemented.

FIG. 5 illustrates an exemplary computing environment 500 within which systems and methods for portable digital rights for multi-device content use, as well as the computing, network, and system architectures described herein, can be either fully or partially implemented. Exemplary computing environment 500 is only one example of a computing system and is not intended to suggest any limitation as to the scope of use or functionality of the architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable and/or non-removable, volatile and/or non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on RAM 510, ROM 512, hard disk 516, magnetic disk 520, and/or optical disk 524, including by way of example, an operating system 528, one or more application programs 530, other program modules 532, and program data 534. Each of such operating system 528, application program(s) 530, other program modules 532, program data 534, or any combination thereof, may include one or more embodiments of the systems and methods described herein.

A user can interface with computing device 502 via any number of different input devices such as a keyboard 536 and pointing device 538 (e.g., a "mouse"). Other input devices 540 (not shown specifically) may include a microphone, joystick, game pad, controller, satellite dish, serial port, scanner, and/or the like. These and other input devices are connected to the processors 504 via input/output interfaces 542 that are coupled to the system bus 508, but may be connected by other interface and bus structures, such as a parallel port, game port, and/or a universal serial bus (USB).

A display device 544 (or other type of monitor) can be connected to the system bus 508 via an interface, such as a video adapter 546. In addition to the display device 544, other output peripheral devices can include components such as speakers (not shown) and a printer 548 which can be connected to computing device 502 via the input/output interfaces 542.

Computing device 502 can operate in a networked environment using logical connections to one or more remote computers, such as remote computing device 550. By way of example, remote computing device 550 can be a personal computer, portable computer, a portable computing-based device, a portable electronic and/or communication device, a server, a router, a network computer, a peer device or other common network node, and the like. The remote computing device 550 is illustrated as a portable computer that can include any number and combination of the different components, elements, and features described herein relative to computing device 502.

Logical connections between computing device 502 and the remote computing device 550 are depicted as a local area network (LAN) 552 and a general wide area network (WAN) 554. Such networking environments are commonplace in offices, enterprise-wide computer networks, intranets, and the Internet. When implemented in a LAN networking environment, the computing device 502 is connected to a local network 552 via a network interface or adapter 556. When implemented in a WAN networking environment, the computing device 502 typically includes a modem 558 or other means for establishing communications over the wide area network 554. The modem 558 can be internal or external to computing device 502, and can be connected to the system bus 508 via the input/output interfaces 542 or other appropriate mechanisms. The illustrated network connections are merely exemplary and other means of establishing communication link(s) between the computing devices 502 and 550 can be utilized.

In a networked environment, such as that illustrated with computing environment 500, program modules depicted relative to the computing device 502, or portions thereof, may be stored in a remote memory storage device. By way of example, remote application programs 560 are maintained with a memory device of remote computing device 550. For purposes of illustration, application programs and other executable program components, such as operating system 528, are illustrated herein as discrete blocks, although it is recognized that such programs and components reside at various times in different storage components of the computing device 502, and are executed by the one or more processors 504 of the computing device 502.

Although embodiments of portable digital rights for multiple devices have been described in language specific to features and/or methods, it is to be understood that the subject of the appended claims is not necessarily limited to the specific features or methods described. Rather, the specific features and methods are disclosed as example implementations of portable digital rights for multiple devices.

The invention claimed is:

1. A Digital Rights Management (DRM) system, comprising:
   a first device configured with:
     a removable hardware component configured as a token that is associated with a DRM license of a domain, the DRM license cryptographically bound to the token; and
     a removable memory card configured to store protected media content on which the first device is configured to perform actions as permitted by the DRM license;
   a second device configured with the removable hardware component and the removable memory card when removed from the first device and installed in the second device, the second device configured to perform the actions on the protected media content as permitted by the DRM license; and
   a domain controller configured to:
     recognize the second device when the removable hardware component is installed in the second device;
     detect that the removable hardware component has been registered on the domain;
     initiate domain certification of the second device to enable the second device to perform the actions on the protected media content as permitted by the DRM license, the domain certification further enabling the second device to acquire additional protected media content from a content distributor of the domain via a communication network and to playback the additional protected media content at the second device.

2. The DRM system as recited in claim 1, wherein:
   the first device is further configured with an internal memory configured to store further additional protected media content on which the first device is configured to perform the actions as permitted by the DRM license; and
   the first device is restricted from performing the actions on the further additional protected media content when the removable hardware component configured as the token is removed from the first device.

3. The DRM system as recited in claim 1, wherein the removable hardware component is a Subscriber Identity Module (SIM) card that is associated with the DRM license.

4. The DRM system as recited in claim 1, wherein the removable hardware component includes a certificate and private key associated with the DRM license, the second device further configured to perform the actions on the protected media content when the removable hardware component with the certificate and the private key is installed in the second device.

5. The DRM system as recited in claim 1, wherein the DRM license is associated with license identifiers that, in combination, authenticate the first device to the domain controller of the DRM system.

6. A computer-implemented method for Digital Rights Management (DRM), comprising:
   installing, at a computing device, a removable memory card comprising protected media content, the removable memory card previously installed at an additional computing device;
   installing a removable hardware component at the computing device, the removable hardware component comprising a token that is associated with a DRM license for a domain, the removable hardware component previously installed at the additional computing device, the installing causing the removable hardware component to be detected by a domain controller of the domain as being previously registered on the domain;
   initiating a domain certification of the computing device by the domain controller responsive to installing the removable hardware component, the domain certification enabling the computing device to perform actions on the protected media content as permitted by the DRM license, the domain certification further enabling the computing device to acquire additional protected media content from a content distributor of the domain via a communication network and to playback the additional protected media content at the computing device.

7. The computer-implemented method as recited in claim 6, wherein the domain certification restricts the additional computing device from performing the actions on further additional protected media content stored on an internal memory of the additional computing device.

8. The computer-implemented method as recited in claim 6, wherein the removable hardware component is a Subscriber Identity Module (SIM) card that is associated with the DRM license.

9. The computer-implemented method as recited in claim 6, wherein the removable hardware component includes a certificate and private key associated with the DRM license, and wherein the computing device performs the actions on the protected media content when the removable hardware component with the certificate and the private key is installed in the second device.

10. The computer-implemented method as recited in claim 6, wherein the DRM license is associated with license identifiers that, in combination, authenticate the first device to the DRM domain controller.

11. One or more computer-readable storage devices comprising instructions stored thereon that, responsive to execution at a computing device, cause the computing device to perform operations comprising:
    initiating a domain certification of the computing device by a domain controller responsive to a removable hardware component being installed at the computing device, the removable hardware component comprising a token that is associated with a DRM license for a domain, the removable hardware component previously installed at an additional computing device, the installing causing the removable hardware component to be detected by the domain controller of the domain as being previously registered on the domain, the domain certification enabling the computing device to perform actions on protected media content as permitted by the DRM license and enabling the computing device to acquire additional protected media content from a content distributor of the domain via a communication network and to playback the additional protected media content at the computing device; and performing the actions on the protected media content as permitted by the DRM license.

12. The one or more computer-readable storage devices as recited in claim 11, further comprising additional instructions that, responsive to execution at the computing device, cause the computing device to perform operations further comprising causing the additional computing device to be restricted from performing the actions on further additional protected media content stored on an internal memory at the additional computing device.

13. The one or more computer-readable storage devices as recited in claim 11, wherein the removable hardware component is a Subscriber Identity Module (SIM) card that is associated with the DRM license.

14. The one or more computer-readable storage devices as recited in claim 11, wherein the removable hardware component includes a certificate and private key associated with the DRM license, the additional computing device further configured to perform the actions on the protected media content when the removable hardware component with the certificate and the private key is installed in the additional computing device.

15. The one or more computer-readable storage devices as recited in claim 11, wherein the DRM license is associated with license identifiers that, in combination, are configured to authenticate the computing device to the DRM domain controller.

\* \* \* \* \*